US010552600B2

(12) United States Patent
Petersen et al.

(10) Patent No.: US 10,552,600 B2
(45) Date of Patent: Feb. 4, 2020

(54) SECURING A MEDIA STORAGE DEVICE USING APPLICATION AUTHORITY ASSIGNMENT

(71) Applicant: Lenovo Enterprise Solutions (Singapore) Pte. Ltd., Singapore (SG)

(72) Inventors: John Michael Petersen, Wake Forest, NC (US); Gary David Cudak, Wake Forest, NC (US); Shareef Fathi Alshinnawi, Apex, NC (US); Ajay Dholakia, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 276 days.

(21) Appl. No.: 15/342,022

(22) Filed: Nov. 2, 2016

(65) Prior Publication Data
US 2018/0121645 A1 May 3, 2018

(51) Int. Cl.
*G06F 21/44* (2013.01)
*G06F 21/51* (2013.01)

(52) U.S. Cl.
CPC .............. *G06F 21/44* (2013.01); *G06F 21/51* (2013.01); *G06F 2221/034* (2013.01)

(58) Field of Classification Search
CPC ..... G06F 21/44; G06F 2221/034; G06F 21/51
See application file for complete search history.

(56) References Cited

U.S. PATENT DOCUMENTS 5,452,431 A * 9/1995 Bournas .............. G06F 12/1441
235/382
2003/0061504 A1 * 3/2003 Sprigg .................... G06F 21/53
726/6
2005/0071537 A1 * 3/2005 New ...................... G06F 3/0608
711/100

OTHER PUBLICATIONS

Chirgwin, R., "Michigan electricity utility downed by ransomware attack," The Register, May 3, 2016, pp. 1-4, as retreived from http://www.theregister.co.uk/2016/05/03/michigan_electricity_utility_downed_by_ransomware_attack/.
Seltzer et al., "Rogue Tor node wraps executables with malware," ZDNET, Oct. 27, 2014, pp. 1-2, retrieved from http://www.zdnet.com/article/rogue-tor-node-wraps-executables-with-malware/.
Bitdefender, "How Ransomware protection works in Bitdefender 2016," Apr. 2016, pp. 1-3, retreived from http://www.bitdefender.com/support/how-ransomware-protection-works-in-bitdefender-2016-1549.html.

* cited by examiner

Primary Examiner — Baotran N To

(57) ABSTRACT

In one embodiment, a system includes a media storage device, a processor, and logic integrated with and/or executable by the processor. The logic is configured to cause the processor to associate a first subset of storage space on the media storage device with a first group of applications executing on a hardware processor. The logic is also configured to cause the processor to receive a request from an application to access the first subset of storage space on the media storage device. Moreover, the logic is configured to cause the processor to prevent any application other than an application from the first group of applications from accessing the first subset of storage space on the media storage device. Other systems, methods, and computer program products for defending against ransomware attacks on devices and systems using application authority assignment are described according to more embodiments.

20 Claims, 4 Drawing Sheets

SECURING A MEDIA STORAGE DEVICE USING APPLICATION AUTHORITY ASSIGNMENT

FIELD OF THE INVENTION

The present invention relates to data security, and more particularly to providing security to data stored to media storage devices from ransomware using application authority assignment.

BACKGROUND

Ransomware is a quickly developing form of malware, in which the attacker gains access to a user's data, typically through a phishing scam or some other method of having an authorized user deploy the malware within the network. Then, the malware encrypts the user's data using strong encryption. Once the data has been encrypted, the attacker contacts the user and extorts money from the user in order to decrypt the user's data. In short, the attacker demands money in exchange for the decryption key for the strong encryption that was used to encrypt the user's data. This type of attack affects many thousands of users and corporations per year. Moreover, and more troubling, the prevalence of ransomware attacks is rising rapidly due to its simple concept and deployment.

There have been many instances of ransomware attacks in the near past. For example, the Board of Water and Light in Lansing, Mich., was recently attacked by ransomware. The Board of Water and Light first noticed the attack on Apr. 25, 2016, but was not able to fully recover from the attack for over a week, costing money and time.

Ransomware attacks work because conventional file systems utilize access control based on user accounts and authority that is associated with a user's account. When a ransomware application gains access to the user account (which happens when the ransomware is harmful), then it is able to access the entire user space. More troubling, when ransomware gains access to an administrator's (root) account, it is able to access the entire file system.

SUMMARY

In one embodiment, a system includes a media storage device, a processor, and logic integrated with and/or executable by the processor. The logic is configured to cause the processor to associate a first subset of storage space on the media storage device with a first group of applications executing on a hardware processor. The logic is also configured to cause the processor to receive a request from an application to access the first subset of storage space on the media storage device. Moreover, the logic is configured to cause the processor to prevent any application other than an application from the first group of applications from accessing the first subset of storage space on the media storage device.

In another embodiment, a computer program product includes a computer readable medium having stored thereon computer readable program instructions executable by a processor to cause the processor to perform a method. The method includes associating a first subset of storage space on a first media storage device with a first group of applications executing on a hardware processor. The method also includes receiving a request from an application to access the first subset of storage space on the first media storage device. Moreover, the method includes preventing any application other than an application from the first group of applications from accessing the first subset of storage space on the first media storage device. The first subset of storage space includes an amount of storage space on the first media storage device that is less than an entirety of storage space on the first media storage device.

In yet another embodiment, a computer-implemented method includes associating a first subset of storage space on a first media storage device with a first group of applications executing on a hardware processor. The method also includes receiving a request from an application to access the first subset of storage space on the first media storage device. Moreover, the method includes preventing any application other than an application from the first group of applications from accessing the first subset of storage space on the first media storage device. The first subset of storage space includes an amount of storage space on the first media storage device that is less than an entirety of storage space on the first media storage device.

Other aspects, features, and embodiments of the presently disclosed inventive concepts will be appreciated from reviewing the following detailed descriptions, figures, and claims in full detail. The descriptions and figures are provide for illustrative purposes and should be understood as not limiting on the scope of the inventive concepts disclosed herein.

DETAILED DESCRIPTION

Figure 1:
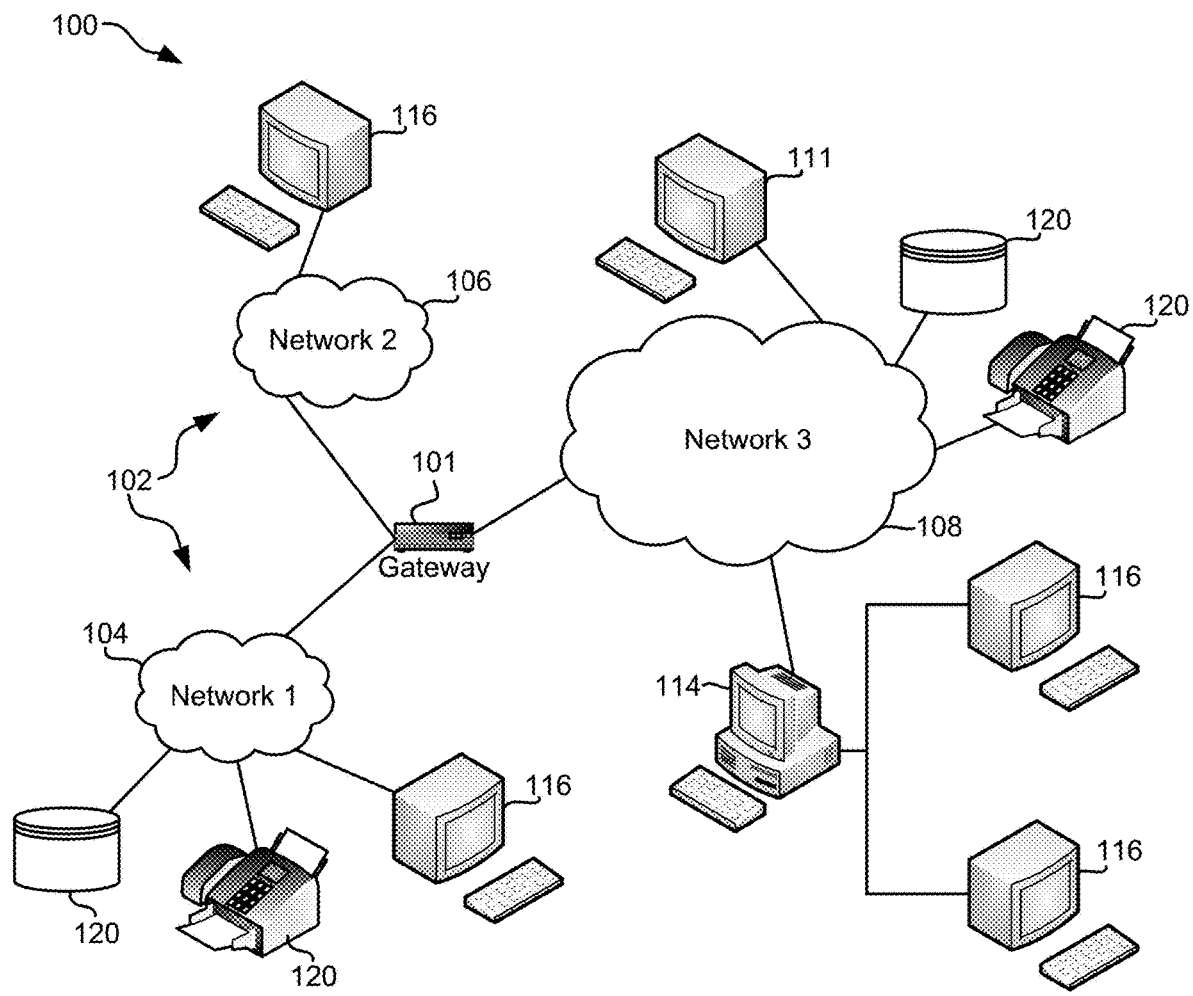
FIG. 1 illustrates a network architecture, in accordance with one possible embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Generally, the presently disclosed inventive concepts relate to defending against ransomware attacks on devices and systems using an application authority assignment methodology.

Thus, in one general embodiment, a system includes a media storage device, a processor, and logic integrated with and/or executable by the processor. The logic is configured to cause the processor to associate a first subset of storage space on the media storage device with a first group of applications executing on a hardware processor. The logic is also configured to cause the processor to receive a request from an application to access the first subset of storage space on the media storage device. Moreover, the logic is configured to cause the processor to prevent any application other than an application from the first group of applications from accessing the first subset of storage space on the media storage device.

In another general embodiment, a computer program product includes a computer readable medium having stored thereon computer readable program instructions executable by a processor to cause the processor to perform a method. The method includes associating a first subset of storage space on a first media storage device with a first group of applications executing on a hardware processor. The method also includes receiving a request from an application to access the first subset of storage space on the first media storage device. Moreover, the method includes preventing any application other than an application from the first group of applications from accessing the first subset of storage space on the first media storage device. The first subset of storage space includes an amount of storage space on the first media storage device that is less than an entirety of storage space on the first media storage device.

In yet another general embodiment, a computer-implemented method includes associating a first subset of storage space on a first media storage device with a first group of applications executing on a hardware processor. The method also includes receiving a request from an application to access the first subset of storage space on the first media storage device. Moreover, the method includes preventing any application other than an application from the first group of applications from accessing the first subset of storage space on the first media storage device. The first subset of storage space includes an amount of storage space on the first media storage device that is less than an entirety of storage space on the first media storage device.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input, and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As an option, the present architecture 100 may be implemented in conjunction with features from any other embodiment listed herein, such as those described with reference to the other figures. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer, or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
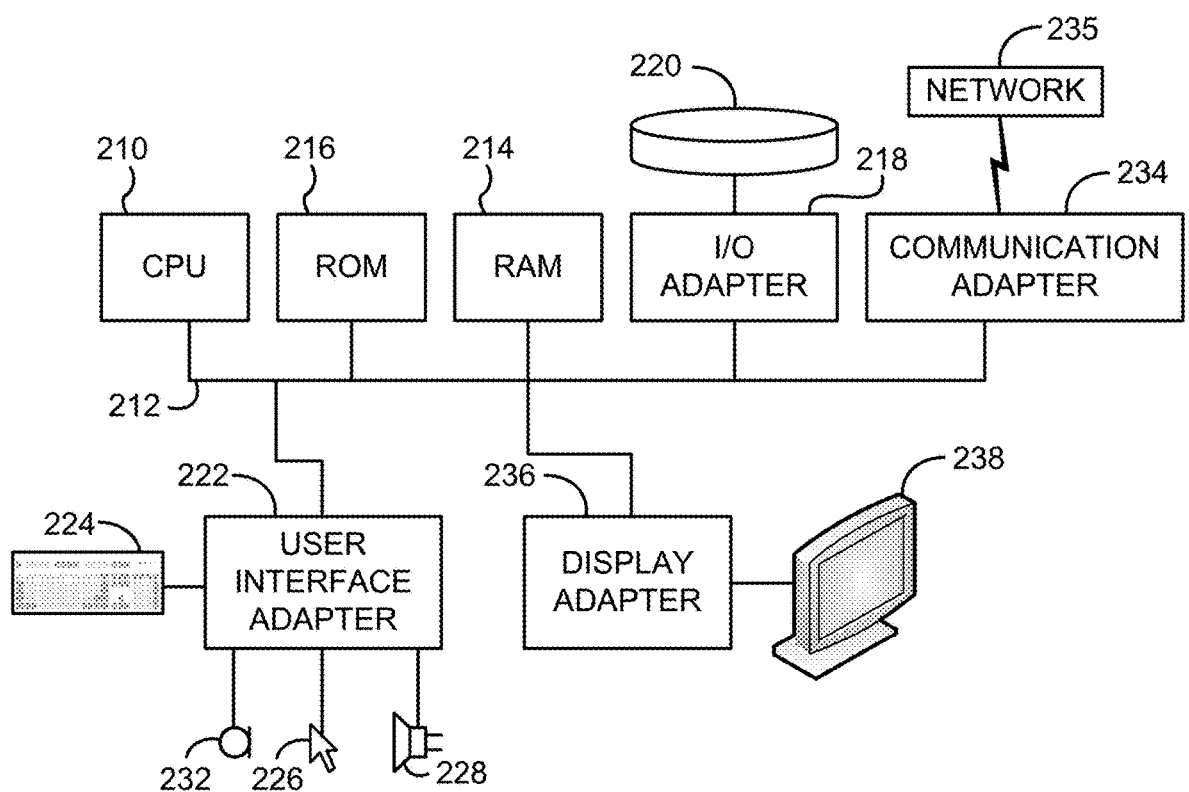
FIG. 2 illustrates an exemplary system, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.ee Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Networks, mainframes, servers, hosts, and other computing devices typically store data on media storage devices, such as hard disk drives (HDDs), optical drives, solid state drives (SSDs), magnetic tape drives, etc. Any type of media storage device may be used to store data, such that it is accessible to users when requested. However, it is not appropriate nor advisable to let anyone access the data that is stored to these media storage devices without first determining whether they are authorized to have such access. Malicious actors may attempt to access the data without authorization, which may cause data to be moved, overwritten, deleted, and/or encrypted when the malicious actor has write access to the data.

In order to protect data that is stored to a media storage device, a subset of storage space (such as one or more sectors) on the media storage device may be assigned to a specific application, thereby eliminating the ability for other applications to make write requests to that subset of storage space, including ransomware.

This protection may be applied to end-user computing devices that utilize media storage devices, such as laptop computers, tablet computers, smartphones, enterprise computing systems, etc. This protection may, in another approach, be applied to a network that includes many media storage devices that are accessible from a plurality of terminals or consoles, such that data stored to the media storage devices is protected from unauthorized access across many different platforms.

Figure 3:
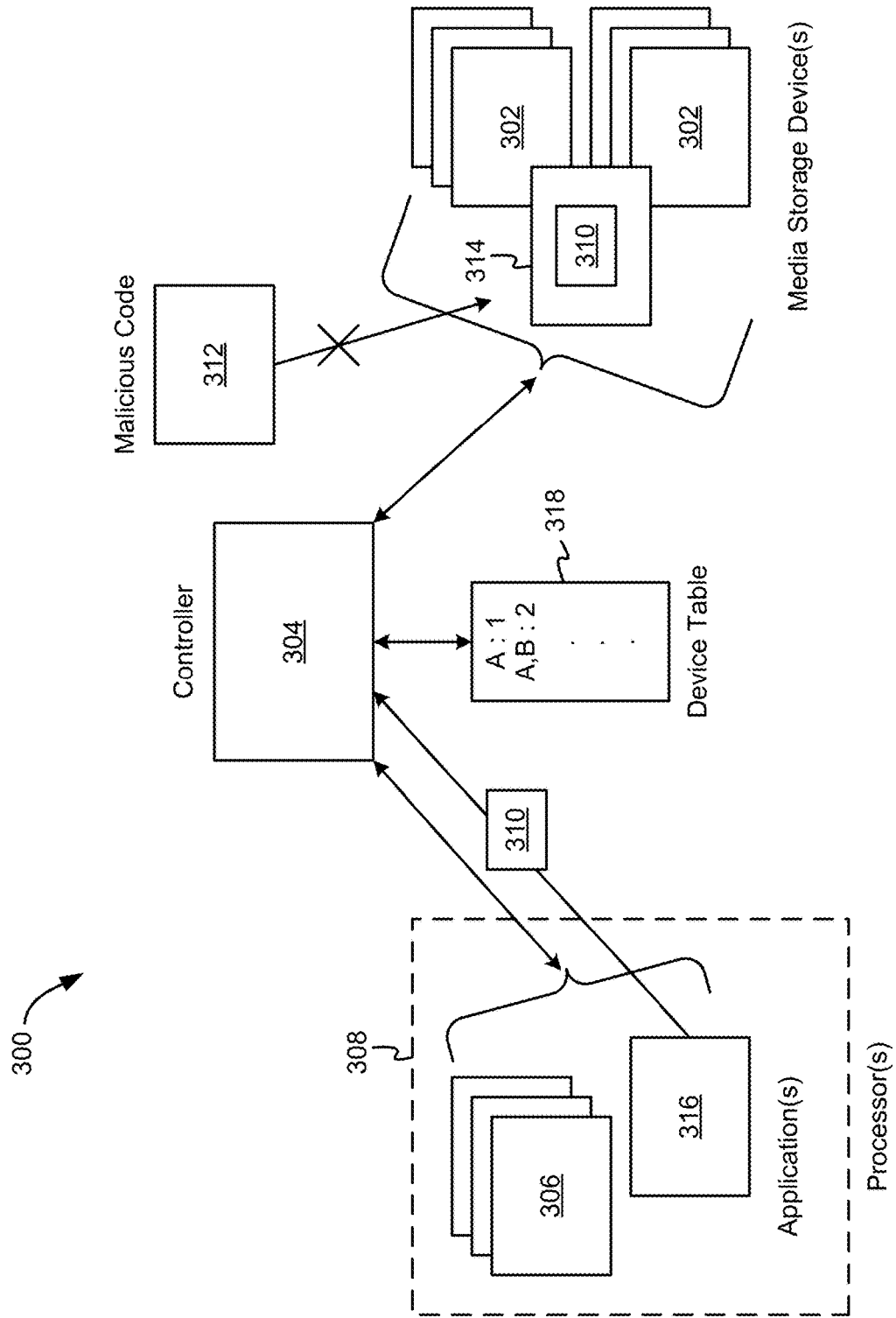
FIG. 3 illustrates a system in accordance with one embodiment.

Now referring to FIG. 3, a system 300 is shown which may be utilized in the context of the embodiments described herein. The system 300 includes one or more media storage devices 302, a controller 304, and one or more applications 306 operating on at least one processor 308. The controller 304 is in electrical communication with the one or more media storage devices 302 and the one or more applications 306 operating on the at least one processor 308. In one embodiment, the controller 304 may be a hardware device having at least one hardware processor, a memory in communication with the hardware processor, and an interface that enables communication between the hardware processor, the one or more media storage devices 302, and the one or more applications 306 operating on the at least one processor 308.

In another embodiment, the controller 304 may be a software routine, function, logic, etc., that is configured to interact with the one or more media storage devices 302 and the one or more applications 306 operating on the at least one processor 308.

In yet another embodiment, the controller 304 may be a component of a first media storage device 314, such that the controller 304 is configured to manage data storage and retrieval to/from the first media storage device 314. For example, the controller 304 may be a storage controller of the first media storage device 314 that is configured to receive data to be stored, send data that is requested, and manipulate data stored to the storage space of the first media storage device 314.

Any hardware processors of a type known in the art may be used to operate the controller 304 and as the at least one processor 308 executing the one or more applications 306, such as CPUs, ASICs, FPGAs, ICs, microprocessors, hardware chips having logic stored thereon, etc.

In one embodiment, the one or more applications 306 request that data 310 be stored on at least one of the one or more media storage devices 302 via the controller 304. This data 310 is prone to being accessed by an unauthorized actor 312, such as malware, and specifically ransomware.

As used herein, "access" may refer to writing new data to available storage space on a media storage device, overwriting previously stored data on a media storage device, reading previously stored data from a media storage device, moving previously stored data on a media storage device to another location on the media storage device or to a different media storage device, and/or deleting previously stored data from a media storage device. In specific embodiments, "access" refers to writing data (whether new data or overwriting existing data) to a media storage device, as this writing of encrypted data (over existing unencrypted data) is a primary function of ransomware, that if defeated, would prevent the ransomware from accomplishing its malicious goals.

In another embodiment, the unauthorized actor 312 may request that data 310 be stored on at least one of the one or more media storage devices 302, such request being intercepted by the controller 304 or provided thereto in a normal write request for one of the one or more media storage devices 302. In this case, the data 310 would typically be corrupt, encrypted, or in some other way cause data already stored to one or more media storage devices 302 to become unusable. Therefore, it is desirable to prevent this type of write request from being executed on the one or more media storage devices 302.

Therefore, in order to protect the security of the one or more media storage devices 302, along with any data stored thereto, and prevent unauthorized actors 312 from accessing such stored data or write data of their choosing on (and possibly overwrite data already stored on) one of the one or more media storage devices 302, in one embodiment, the controller 304 is configured to associate (and assign) a subset of storage space on a first media storage device 314 of the one or more media storage devices 302 with a first application 316 of the one or more applications 306. This process may be repeated for each application that has authority to access data stored to any of the one or more media storage devices 302 by further assigning other subsets of storage space on the one or more media storage devices 302 to those authorized applications of the one or more applications 306. The subset of storage space is indicative of being an amount of storage space on the first media storage device 314 that is less than an entirety of the storage space on the first media storage device 314. Any particular dividing of the first media storage device 314 may be used to dictate the size of the subset of storage space, such as user-created or device-created partitions, physical sectors, logical sectors, tracks, bands, data blocks, etc.

Each subset of storage space may be assigned on a one-to-one basis with one application, or it may be assigned to multiple applications, with the assignation being updated from time to time to ensure that only authorized applications may gain access to data stored in any particular subset of storage space on the one or more media storage devices 302.

This assigning of storage space with one or more applications may be performed by the controller 304 in response to a request from a user, an administrator, or some other authorized manual request. In one further embodiment, the user may assign a desired subset of storage space to one or more applications, and the drive then handles the sector assignments In another embodiment, the assigning of storage space with one or more applications may be performed by the controller 304 in response to a request from the application to access the data, store new data, or delete data from the first media storage device 314. Upon receipt of such a request, the controller 304 is configured to determine whether the application has authority to perform the requested access to the data stored to the first media storage device 314. This determination may be made using any available resources from which to make the determination. For example, metadata may be utilized that includes a profile of the application, credentials of the application, history of interactions between the application and this media storage device and any other media storage devices, etc.

Because a particular subset of storage space is assigned to the first application 316, all other applications other than the first application 316 that is assigned the subset of storage space may be prevented from accessing any data stored to the assigned subset of storage space. In order to cause these other applications from accessing the assigned subset of storage space on the first media storage device 314, the controller 304 is further configured to prevent any other application (aside from the first application 316) from accessing (e.g., reading and writing) data to the subset of storage space on the first media storage device 314. This prevents unauthorized applications from gaining access to the subset of storage space.

The controller 304 is further configured to store the relationships between subsets of storage space and applications assigned thereto in a device table 318. The device table 318 may be a list, database, tabular representation, etc., of stored information. The device table 318 includes all subsets of storage space on all media storage devices managed by the controller 304, along with each application that is assigned to a particular subset of storage space. The device table 318 may also include an indication of the size and type of subsets of storage space, type of media storage devices, size of media storage devices, and/or any other relevant information that would enable one of skill in the art to understand and utilize the assignment functionality described herein. The controller 304 may also include a graphical user interface (GUI) that allows a user to directly interact with the device table 318, thereby enabling easier implementation of assignments.

In a further embodiment, in order to ensure that all requests for data access on the one or more media storage devices 302 are properly analyzed by the controller 304, OS file system commands may be altered, modified, added to, or otherwise adjusted in order to include an application identifier (ID) of the application which is requesting access to the data stored to the media storage device. In various embodiments, the application ID may be the name of the application requesting access in clear text, a randomly-assigned, pseudo-randomly-assigned, or predetermined alpha-numeric sequence, numeric sequence, alphabetic sequence, etc., which is mapped to one or more characteristics of the requesting application. The one or more characteristics may include application name, location of the application, hash value resultant from applying a hashing algorithm to at least one aspect of the application, such as an executable file of the application. Any type of hashing algorithm may be used, such as a checksum, md5sum, sha256sum, etc. The application ID, after being calculated, may be stored in an encrypted file local to the application's executable file, in the device table 318 for comparison with requesting applications, or in another location predetermined by the controller 304 or agreed upon in advance of attempting to access data stored to the one or more media storage devices 302. Each time an application attempts to gain access to data stored to the one or more media storage devices 302, the application ID is verified and compared to assigned subsets of storage space for that particular application.

In one embodiment, the application ID may be converted into an obscure identifier by an algorithm in the controller 304 or a sub-controller of a particular media storage device.

In response to a determination that the application ID does not match that of any application assigned to a requested subset of storage space on one of the media storage devices, the request is denied.

In response to a determination that the application ID does match one application assigned to the requested subset of storage space on one of the media storage devices, the request is allowed and the requesting application is granted access to the data.

In a further embodiment, when an application has authority to access a particular subset of storage space on the one or more media storage devices 302, any data that is caused to be written by the application to the one or more media storage devices 302 is stored to a subset of storage space that is assigned to the application which has requested writing of the data. In response to a determination that there is insufficient storage space available in the assigned subset of storage space on the one or more media storage devices 302, additional free subset(s) of storage space are assigned to the authorized application and this further relationship is updated in the device table 318.

Figure 4:
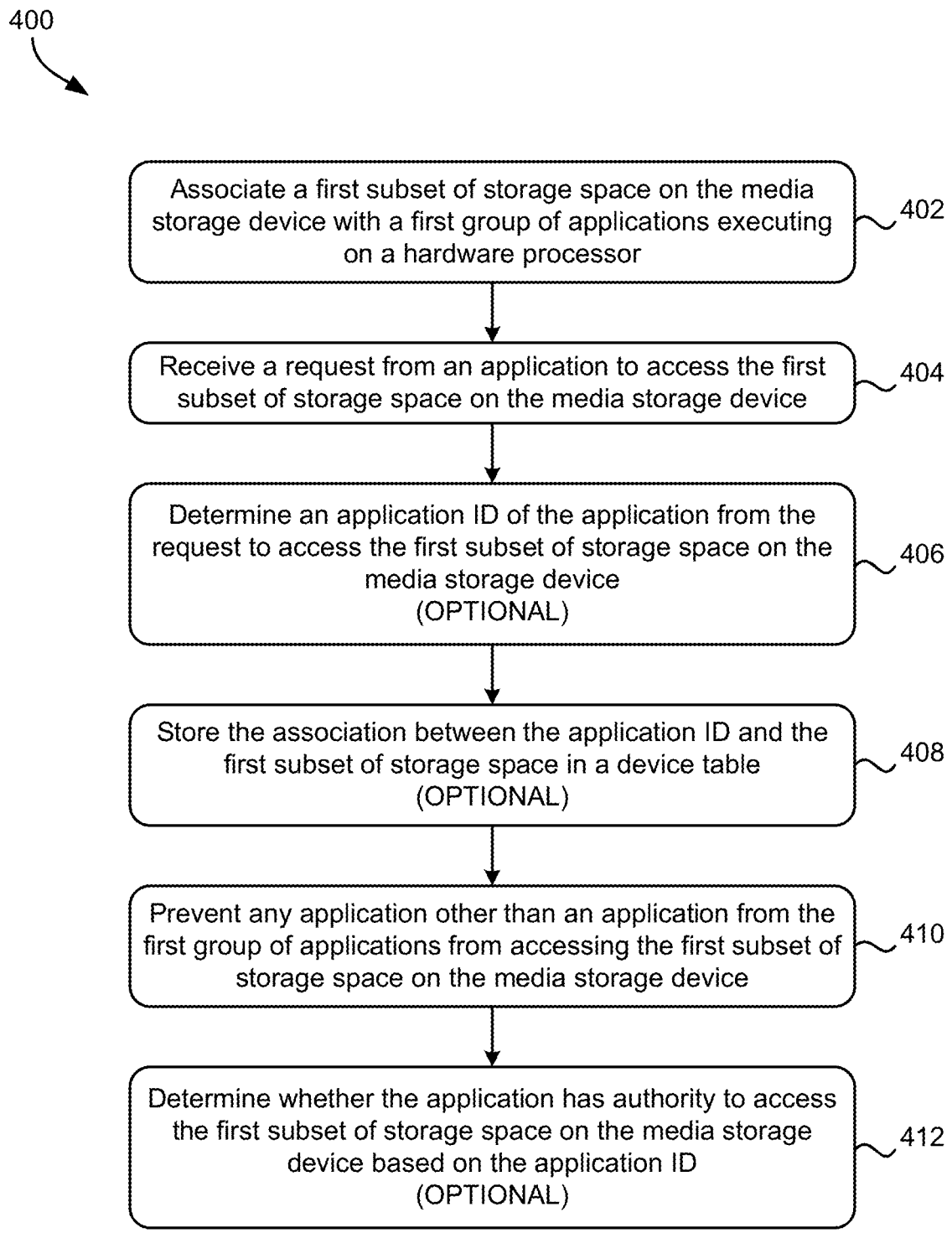
FIG. 4 is a flowchart of a method, according to one embodiment.

Now referring to FIG. 4, a flowchart of a method 400 is shown according to one embodiment. Method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of method 400 may be performed by any suitable component of the operating environment. For example, in various embodiments, method 400 may be partially or entirely performed by one or more devices of a network environment, or some other device having one or more processors therein. The processor, e.g., processing circuit(s), chip(s), and/or module(s) implemented in hardware and/or software, and preferably having at least one hardware component may be utilized in any device to perform one or more steps of method 400. Illustrative processors include, but are not limited to, a CPU, an ASIC, a FPGA, etc., combinations thereof, or any other suitable computing device known in the art.

As shown in FIG. 4, method 400 may initiate with operation 402, where a first subset of storage space on the media storage device is associated with a first group of applications executing on a hardware processor. The first subset of storage comprises an amount of storage space on the media storage device that is less than an entirety of storage space on the media storage device. Any particular division of the media storage device may be used to dictate the size of the first subset of storage space (and all other subsets of storage space on the media storage device), such as user-created or device-created partitions, physical sectors, logical sectors, tracks, bands, data blocks, etc.

In operation 404, a request is received from an application to access the first subset of storage space on the media storage device. The application may be one of the first group of applications that is associated with the first subset of storage space on the media storage device, or it may be some other application that may or may not have authority to access the data in the first subset of storage space on the media storage device.

The request may be any type of access request, such as a write request, read request, delete request, etc., and method 400 acts as a filter for any access requests to the media storage device.

In optional operation 406, an application ID of the application may be determined from the request to access the first subset of storage space on the media storage device. This determination may be based on a header of the request, metadata included in the request, etc.

In various embodiments, the application ID may be the name of the application requesting access in clear text, a randomly-assigned, pseudo-randomly-assigned, or predetermined alpha-numeric sequence, numeric sequence, alphabetic sequence, etc., which is mapped to one or more characteristics of the requesting application. The one or more characteristics may include application name, location of the application, hash value resultant from applying a hashing algorithm to at least one aspect of the application, such as an executable file of the application. Any type of hashing algorithm may be used, such as a checksum, md5sum, sha256sum, etc.

In one embodiment, the application ID may be determined based on a checksum of an executable file of the application.

In optional operation 408, this association may be stored in a device table. The device table, in one embodiment, may be stored locally to the media storage device, accessible to the component that is performing method 400, stored to a controller which manages the media storage device, etc.

In a further embodiment, the device table is configured to store associations between applications and subsets of storage space on the media storage device. Moreover, operation 402 may further include storing, in the device table, the application ID in association with a reference to the first subset of storage space on the media storage device.

In operation 410, any application other than an application from the first group of applications is prevented from accessing the first subset of storage space on the media storage device. In one embodiment, an error code may be returned to the application instead of data or write privileges to prevent the application from accessing the first subset of storage space on the media storage device. The error code may be a standard OS error code or disk error code from a HDD, SSD, or some other standard, known type of error code that is returned when access to a subset of storage space on a media storage device is not allowed, data is not found, or a write fails for some reason. This error code may originate from firmware of the media storage device, from a controller that manages storage on the media storage device, or from some other intermediary device between the application and the media storage device that acts as a gatekeeper.

In optional operation 412, it is determined whether the application has authority to access the first subset of storage space on the media storage device based on the application ID. Further, the device table may be consulted to determine whether the application has authority to access data stored to the first subset of storage space on the media storage device.

For example, the device table may be consulted to determine whether the device table indicates that the application ID for the application is associated with a reference to the first subset of storage space on the media storage device. The reference may be any identifying number, alphanumeric string, alphabetic string, hash, etc., that may be used to distinguish the first subset of storage space from all other subsets of storage space on the media storage device. After making this determination, the application is allowed to access the first subset of storage space on the media storage device in response to determining that the device table indicates an association between the application ID for the application and the reference to the first subset of storage space on the media storage device. Otherwise, an error code is returned to the application instead of access in response to determining that the device table does not indicate the association between the application ID for the application and the reference to the first subset of storage space on the media storage device.

In one embodiment, accessing the first subset of storage space on the first media storage device may include writing data (new data or overwriting existing data) to the first subset of storage space on the media storage device, but not reading data. This limits the delay that may be caused by checking application IDs against the device table to specifically prevent ransomware attacks.

In one embodiment, the first subset of storage space on the media storage device may be associated with the first group of applications in response to at least one application of the first group of applications writing new data to the first subset of storage space on the media storage device.

In a further embodiment, method 400 may include associating one or more additional subsets of storage space on the media storage device with the first group of applications in response to at least one application of the first group of applications writing data to the one or more additional subsets of storage space on the media storage device.

Again, the presently disclosed inventive concepts may be embodied as methods, computer program products, and/or systems in various approaches. In one particular embodiment of a system configured to perform application authority assignment as described above with respect to method 400 and FIG. 4, a system includes at least one device which has thereon a processor and logic integrated with and/or executable by the processor to cause the device to perform method 400.

In another embodiment, a computer program product may be configured to perform method 400 or some embodiment thereof. For example, the computer program product may include a computer readable medium having stored thereon computer readable program instructions executable by a processor to cause the processor to perform method 400.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a media storage device;
a processor; and
logic integrated with and/or executable by the processor, the logic being configured to cause the processor to:
associate a first subset of storage space on the media storage device with a plurality of applications comprising a first group of applications executing on a hardware processor in response to at least one application of the first group of applications writing new data to the first subset of storage space on the media storage device, the association of the first subset of storage space with the plurality of applications being made after the at least one application of the first group of applications writes the new data to the first subset of storage space;
receive a request from an application to access the first subset of storage space on the media storage device; and
prevent any application other than an application from the first group of applications from accessing the first subset of storage space on the media storage device.

2. The system as recited in claim 1, wherein the first subset of storage space comprises an amount of storage space on the media storage device that is less than an entirety of storage space on the media storage device.

3. The system as recited in claim 1, wherein the logic is further configured to cause the processor to:
determine an application identifier (ID) of the application from the request to access the first subset of storage space on the media storage device; and
determine whether the application has authority to access the first subset of storage space on the media storage device based on the application ID.

4. The system as recited in claim 3, wherein the application ID is determined based on a checksum of an executable file of the application.

5. The system as recited in claim 1, wherein the logic is further configured to cause the processor to:
determine an application identifier (ID) of the application from the request to access the first subset of storage space on the media storage device;
create a device table configured to store associations between applications and subsets of storage space on the media storage device, wherein the logic configured to cause the processor to associate the first subset of storage space on the media storage device with the first group of applications is further configured to cause the processor to store, in the device table, the application ID in association with a reference to the first subset of storage space on the media storage device;
determine whether the device table indicates that the application ID for the application is associated with the reference to the first subset of storage space on the media storage device;
allow the application to access the first subset of storage space on the media storage device in response to determining that the device table indicates an association between the application ID for the application and the reference to the first subset of storage space on the media storage device; and
return an error code to the application in response to determining that the device table does not indicate the association between the application ID for the application and the reference to the first subset of storage space on the media storage device.

6. The system as recited in claim 1, wherein the logic configured to cause the processor to access the first subset of storage space on the media storage device is further configured to cause the processor to write data to the first subset of storage space on the media storage device.

7. The system as recited in claim 1, wherein any application of the first group of applications has authority to access the first subset of storage space on the media storage device.

8. The system as recited in claim 1, wherein the logic is further configured to cause the processor to associate one or more additional subsets of storage space on the media storage device with the first group of applications in response to at least one application of the first group of applications writing data to the one or more additional subsets of storage space on the media storage device.

9. A computer program product comprising a non-transitory computer readable medium having stored thereon computer readable program instructions executable by a processor to cause the processor to perform a method, the method comprising:
   associating a first subset of storage space on a first media storage device with a first group of applications executing on a hardware processor, the first subset of storage space being a physical subset of storage space, the association of the first subset of storage space with the first group of applications being made after one of the applications of the first group of applications writes new data to the first subset of storage space;
   receiving a request from an application to access the first subset of storage space on the first media storage device; and
   preventing any application other than an application from the first group of applications from accessing the first subset of storage space on the first media storage device,
   wherein the first subset of storage space comprises an amount of storage space on the first media storage device that is less than an entirety of storage space on the first media storage device.

10. The computer program product as recited in claim 9, wherein the method further comprises:
    determining an application identifier (ID) of the application from the request to access the first subset of storage space on the first media storage device; and
    determining whether the application has authority to access the first subset of storage space on the first media storage device based on the application ID.

11. The computer program product as recited in claim 9, wherein a size of the first subset of storage space is dictated according to physical portions of the first media storage device, the physical portions being selected from the group consisting of physical partitions, physical sectors, tracks, and bands.

12. The computer program product as recited in claim 9, wherein the method further comprises:
    determining an application identifier (ID) of the application from the request to access the first subset of storage space on the first media storage device, wherein the associating the first subset of storage space on the first media storage device with the first group of applications comprises storing, in a device table, the application ID in association with a reference to the first subset of storage space on the first media storage device;
    determining whether the device table indicates that the application ID for the application is associated with the reference to the first subset of storage space on the first media storage device;
    allowing the application to access the first subset of storage space on the first media storage device in response to determining that the device table indicates an association between the application ID for the application and the reference to the first subset of storage space on the first media storage device; and
    returning an error code originated from firmware of the first media storage device to the application in response to determining that the device table does not indicate the association between the application ID for the application and the reference to the first subset of storage space on the first media storage device.

13. The computer program product as recited in claim 9, wherein the accessing the first subset of storage space on the first media storage device comprises writing data to the first subset of storage space on the first media storage device, and wherein the method further comprises associating one or more additional subsets of storage space on the first media storage device with the first group of applications in response to at least one application of the first group of applications writing data to the one or more additional subsets of storage space on the first media storage device.

14. A computer-implemented method, the method comprising:
    associating a first subset of storage space on a first media storage device with a first group of applications executing on a hardware processor in response to one of the applications in the first group of applications writing new data to the first subset of storage space;
    receiving a request from an application to access the first subset of storage space on the first media storage device; and
    preventing any application other than an application from the first group of applications from accessing the first subset of storage space on the first media storage device,
    wherein the first subset of storage space comprises an amount of storage space on the first media storage device that is less than an entirety of storage space on the first media storage device.

15. The computer-implemented method as recited in claim 14, further comprising:
    determining an application identifier (ID) of the application from the request to access the first subset of storage space on the first media storage device; and
    determining whether the application has authority to access the first subset of storage space on the first media storage device based on the application ID.

16. The computer-implemented method as recited in claim 15, wherein the application ID is determined based on a checksum of an executable file of the application.

17. The computer-implemented method as recited in claim 14, further comprising:
    determining an application identifier (ID) of the application from the request to access the first subset of storage space on the first media storage device, wherein the associating the first subset of storage space on the first media storage device with the first group of applications comprises storing, in a device table, the application ID in association with a reference to the first subset of storage space on the first media storage device;
    determining whether the device table indicates that the application ID for the application is associated with the reference to the first subset of storage space on the first media storage device;
    allowing the application to access the first subset of storage space on the first media storage device in response to determining that the device table indicates an association between the application ID for the application and the reference to the first subset of storage space on the first media storage device; and returning an error code originated from firmware of the first media storage device to the application in response to determining that the device table does not indicate the association between the application ID for the application and the reference to the first subset of storage space on the first media storage device.

18. The computer-implemented method as recited in claim 14, wherein the first subset of storage space being a physical subset of storage space, and wherein a size of the first subset of storage space is dictated according to physical portions of the first media storage device, the physical portions being selected from the group consisting of physical partitions, physical sectors, tracks, and bands.

19. The computer-implemented method as recited in claim 14, further comprising associating one or more additional subsets of storage space on the first media storage device with the first group of applications in response to at least one application of the first group of applications writing data to the one or more additional subsets of storage space on the first media storage device.

20. The computer-implemented method as recited in claim 14, wherein the association of the first subset of storage space with the plurality of applications is made after one of the applications of the first group of applications writes the new data to the first subset of storage space.

* * * * *